US005468281A

United States Patent [19]

Kerfoot

[11] Patent Number: 5,468,281

[45] Date of Patent: Nov. 21, 1995

[54] PROCESS FOR THE SEPARATION OF COBALT FROM NICKEL

[75] Inventor: Derek G. E. Kerfoot, St. Albert, Canada

[73] Assignee: Sherritt Gordon Limited, Fort Saskatchewan, Canada

[21] Appl. No.: 335,701

[22] PCT Filed: May 19, 1993

[86] PCT No.: PCT/CA93/00213

§ 371 Date: Nov. 17, 1994

§ 102(e) Date: Nov. 17, 1994

[87] PCT Pub. No.: WO93/23578

PCT Pub. Date: Nov. 25, 1993

[30] Foreign Application Priority Data

May 19, 1992 [CA] Canada .................................. 2068982

[51] Int. Cl.[6] ............................... C22B 3/14; C22B 3/44; C01G 51/00

[52] U.S. Cl. ............................ 75/710; 423/139; 423/140

[58] Field of Search .............................. 75/710; 423/139, 423/140

[56] References Cited

U.S. PATENT DOCUMENTS

| | | | |
|---|---|---|---|
| 2,694,005 | 11/1954 | Schaufelberger | 75/108 |
| 2,694,006 | 11/1954 | Schaufelberger | 75/108 |
| 2,767,054 | 10/1956 | Schaufelberger | 23/117 |
| 2,767,055 | 10/1956 | Schaufelberger | 23/117 |
| 2,822,264 | 2/1958 | Benoit | 75/119 |
| 3,227,513 | 1/1966 | Alexa et al. | 23/14 |
| 3,751,558 | 8/1973 | Crnojevich et al. | 423/144 |
| 3,933,975 | 1/1976 | Nikolic et al. | 423/139 |
| 4,394,357 | 7/1983 | Mounsey | 423/140 |
| 4,563,213 | 1/1986 | Hubred | 423/139 |
| 4,600,435 | 7/1986 | Wiegers | 423/139 |
| 4,619,816 | 10/1986 | Ricketton | 423/139 |
| 5,102,633 | 4/1992 | Husted | 423/140 |
| 5,174,812 | 12/1992 | Price | 423/139 |

FOREIGN PATENT DOCUMENTS

| | | |
|---|---|---|
| 1075867 | 4/1953 | France . |
| 595688 | 4/1934 | Germany . |
| 1023591 | 9/1952 | Germany . |
| 735791 | 3/1953 | United Kingdom . |

OTHER PUBLICATIONS

Chemical Abstracts, vol. 77, No. 16, Oct. 16, 1972, Columbus, Ohio Abstract 104224p p. 155.

Chemical Abstracts, vol. 85, No. 24, Dec. 13, 1976, Columbus, Ohio Abstract No. 190652a, p. 193.

Chemical Engineering, Sep. 7, 1959, p. 145.

The Winning of Nickel—J. R. Boldt J., Edmonton, Alberta pp. 299–314.

*Primary Examiner*—Peter D. Rosenberg
*Attorney, Agent, or Firm*—Arne I. Fors; D. Doak Horne; Jeffrey T. Imai

[57] ABSTRACT

A process is disclosed for separating cobalt in the form of cobalt (III) hexammine sulphate from an aqueous solution containing cobalt (III) hexammine sulphate and nickel (II) hexammine sulphate comprising adding ammonium sulphate to provide an effective amount of ammonium sulphate, saturating the solution with an effective amount of ammonia at a temperature whereby the triple salt of cobalt (III) hexammine sulphate, nickel (III) hexammine sulphate and ammonium sulphate is precipitated, recovering the precipitated triple salt from the solution, and repulping the triple salt with an effective amount of water or aqueous ammonia solution to selectively leach nickel (II) hexammine sulphate to produce a crystalline cobalt (III) hexammine sulphate with a cobalt: nickel ratio of at least 100:1.

16 Claims, 1 Drawing Sheet

PROCESS FOR THE SEPARATION OF COBALT FROM NICKEL

FIELD OF THE INVENTION

This invention relates to a process for the recovery of cobalt from an aqueous solution containing nickel and cobalt and, more particularly, relates to the separation of cobalt from nickel dissolved in an ammoniacal leach liquor to produce a substantially nickel-free cobalt solution from which high purity cobalt metal and salt products can be obtained.

BACKGROUND OF THE INVENTION

A hydrometallurgical process for the treatment of nickel-cobalt-copper sulphide concentrates and mattes to produce high grade nickel and cobalt powders has been in commercial operation for many years. In this process which is described in the publication, "The Winning of Nickel". J. R. Boldt, Jr. (Ed), Toronto, Longmarts Canada Limited, 1967, pages 299 to 314, the nickel sulphide feed materials are leached in ammoniacal ammonium sulphate solution, under elevated air pressure, in horizontal autoclaves. The metals: nickel, cobalt and copper, are dissolved as metal amine complex ions. Iron is oxidized to insoluble hematite, and sulphide sulphur is partially oxidized to form a range of unsaturated sulphur anions which remain in the leach solution. The hematite residue is filtered off and discarded, and the leach solution is treated to remove copper, to partially remove the ammonia, and to oxidize the sulphur anions to sulphate. The purified solution, which contains about 60 g/L Ni and 1 g/L Co, is then treated with hydrogen under elevated pressure and temperature to precipitate nickel selectively as the metal powder. The cobalt remains in the reduced solution which contains about 1 g/L Ni and 1 g/L Co. The residual metals are then precipitated using hydrogen sulphide to produce a mixed nickel cobalt sulphide which forms the feed to the cobalt refining process.

The recovery of cobalt, in this nickel refining process, is much lower than that of nickel, as a result of the adsorption of cobalt by the iron oxide leach residue. Furthermore, the selectivity of the reduction process, for nickel, depends on the maintenance of a low level of cobalt in the purified leach solution. It is only possible to produce nickel powder meeting the market specifications for cobalt, if the Ni:Co ratio is maintained above about 20:1. It will be appreciated therefore that this nickel refining process is not economically effective for the treatment of nickel feed materials with high cobalt content, since significant losses of cobalt to the leach residue and to the nickel powder product will be incurred.

A commercial cobalt refining process based on the soluble cobaltic pentammine process for separating nickel from cobalt, is operated in conjunction with the above nickel refining process. This process is based on U.S. Pat. Nos. 2,694,005, 2,694,006, 2,767,054 and 2,767,055 to Schaufelburger. In the refining process, mixed nickel-cobalt sulphides with a typical Ni:Co ratio of 1:1, are first leached at elevated air pressure and temperature in dilute sulphuric acid solution to dissolve the nickel and cobalt and oxidize the sulphide to sulphate. The acidic leach solution, containing cobalt and nickel sulphates, is purified to remove iron and trace metals such as Cu, Cd and Zn. Ammonia is then added to neutralize the free acid and to adjust the ammonia to metals mole ratio to form the-pentammine ions of divalent nickel and cobalt. The solution is then treated with air under pressure in an autoclave, to oxidize the cobalt (II) pentammine ion to the cobalt (III) pentammine ion. The nickel (II) pentammine ion is not oxidized under these conditions. The oxidized solution is then treated in a two-stage process with concentrated sulphuric acid to selectively precipitate nickel as the nickel ammonium sulphate double salt ($NiSO_4.(NH_4)SO_4$), leaving cobalt (III) pentammine sulphate in solution. After the second stage of nickel removal, the cobaltic solution is essentially nickel-free, with a Co:Ni ratio greater than 1000:1. The cobalt (III) ion is reduced to cobalt (II), and acid is added to adjust the $NH_3$:Co mole ratio to about 2:1. This solution is treated with hydrogen at elevated temperature and pressure to produce cobalt metal powder containing less than 0.1% Ni. This two-stage process, as described in U.S. Pat. No. 2,822,264, produces cobalt powder with a Co:Ni Ratio of greater than 1000:1.

This cobalt-nickel separation process is designed to treat mixed nickel-cobalt sulphides with Ni:Co ratios of about 1:1. As the nickel content of the sulphide increases the process becomes less viable technically and economically, since the mount of nickel double salt to be precipitated and recycled to the nickel circuit increases, while the cobalt concentration in the purified solution decreases. In practice, a Ni:Co ratio of about 3:1 is the maximum that can be handled in this process. It will be appreciated therefore that neither of the above described existing nickel-cobalt sulphide refining processes is suitable for the treatment of nickel-cobalt sulphides with Ni:Co weight ratios in the range 3:1 to 20:1.

When ironific nickel laterite ores are treated by high temperature sulphuric acid pressure leaching, the dissolved nickel and cobalt are both recovered in high yields as a mixed sulphide typically containing about 55% Ni and 5% Co, i.e. with a Ni:Co ratio of about 10:1. This process is expected to become increasingly important economically in the future as the nickel mining industry switches to the treatment of laterite ores, as economically viable sulphide ore reserves are depleted. Material of this composition cannot be treated economically by either of the above existing hydrometallurgical refining processes.

Several methods of refining mixed nickel-cobalt sulphides of this type have been proposed in recent years, although none is known to have been commercialized successfully. A process described in Chemical Engineering, Sep. 7, 1959, page 145, included an acidic pressure leach to oxidize nickel and cobalt sulphides to the corresponding sulphates, solution purification to remove iron, aluminum, copper, lead and zinc, and selective reduction of nickel with hydrogen. However, since the cobalt content of the solution fed to the nickel reduction operation was about 5 g/L, excessive contamination of the nickel powder with cobalt was unavoidable, and the nickel powder would not meet current market cobalt specifications.

This problem was addressed in U.S. Pat. No. 3,751,558, which proposed a method of selectively precipitating cobalt (II) from the acid leach liquor produced by the pressure leaching of nickel-cobalt sulphides. In this process, a predetermined amount of ammonia was added to the acidic solution, at low temperature to precipitate a basic cobalt (II) sulphate. The product solution typically had a Ni:Co ratio of over 1000:1, but no methods of treating the basic cobalt sulphate precipitate were proposed in this patent. Canadian Patent No. 1,147,970 describes a similar approach. Precipitation of the basic cobalt (II) sulphate using ammonia was originally described in German Patent No. 595,688 in 1934.

A number of methods proposed for the separation of cobalt from nickel have been based on the differential solubilities of the ammine complexes of nickel (II) and cobalt (III). Such methods have been proposed, for example, in U.S. Pat. No. 2,728,636, to Van Hare; U.S. Pat. No. 3,227,513, to Alexa and Reicherr; U.S. Pat. No. 3,967,957, to Fonseca; and U.S. Pat. No. 4,208,380, to Hamalainen.

Prior art processes for the separate recovery of nickel and cobalt from sulphuric acid leach liquors are exemplified by South African Patent No. 75 00026. This patent describes a process in which a minor portion of the feed solution containing nickel and cobalt is neutralized with ammonium hydroxide to precipitate nickel(II) hydroxide, which is then oxidized to nickel(III) hydroxide using a strong oxidant, such as a hypochlorite or a persulphate. This nickel(III) hydroxide is then used as a reagent to precipitate cobalt(III) hydroxide selectively from the major portion of the feed solution, to produce a nickel solution depleted in cobalt. The precipitate, which is a mixture of nickel(II) and cobalt(III) hydroxides, is further treated by redissolution in ammoniacal ammonium sulphate to form a solution containing nickel(II) and cobalt (III) pentammine sulphates, from which nickel is selectively precipitated as crystalline nickel ammonium sulphate, by acidifying the solution with sulphuric acid. The final traces of nickel are removed from the purified solution by ion exchange.

SUMMARY OF THE INVENTION

It is an object of the present invention to provide a process for the production of refined cobalt from nickel-cobalt sulphides with Ni:Co weight ratios in the range 1:1 to 20:1. Since the existing nickel refinery utilizes solutions which typically contain high levels of ammonia and ammonium sulphate, it is desirable that the nickel-cobalt sulphides should be leached directly in an ammoniacal pressure leach system, to produce an ammoniacal leach solution containing nickel and cobalt values. It is a principal object of the present invention to provide a process in which an ammoniacal leach solution containing nickel and cobalt values can be treated to selectively remove cobalt to reduce the cobalt content of the solution to be treated in the nickel reduction step, at least to the level at which it will not contaminate the nickel powder product, i.e. the solution Ni:Co ratio should be greater than about 20:1. It is another object of the invention that the cobalt precipitate from the cobalt separation process should be amenable to upgrading to a nickel-free cobalt product at minimum cost.

Advantageously it has been found that these objectives can be achieved by a relatively simple process.

The mixed nickel-cobalt sulphides are first pressure leached, in an ammoniacal ammonium sulphate solution under elevated air pressure, at a temperature of 80° C. or higher, to oxidize the nickel and cobalt sulphides to the corresponding sulphates. The ammonia:metal mole ratio is controlled at about 6:1 to maximize the formation of the hexammine complex ions of nickel (II) and cobalt (III). It will be understood that the dissolved cobalt in the ammoniacal leach liquor will be predominantly in the (III) oxidation state, in contrast to acidic leach liquors where the cobalt is predominantly in the (II) oxidation state.

The successful operation of the process of this invention depends on the formation of a triple salt containing cobalt (III) hexammine sulphate, nickel (II) hexammine sulphate and ammonium sulphate. On the basis of chemical analysis and solution ultra violet-visible spectroscopic data it is believed that the composition of this salt may be represented as:

$$NH_4[Co(NH_{36}][Ni(NH_3)_6](SO_4)_3.6H_2O$$

The theoretical cobalt and nickel contents of this salt are 8.00% and 7.97% respectively. Samples of the salt typically analyze 7.5 to 9.0% Co and 8.0 to 9.3% Ni. No prior description of this compound has been found in either the chemical or patent literature.

An important aspect of the process of the invention is the discovery that this cobalt enriched triple salt can be precipitated very simply by sparging anhydrous ammonia into ammoniacal ammonium sulphate leach liquor containing cobaltic and nickel hexammine sulphate, at low temperatures (less than 50° C.), to raise the titratable ammonia concentration to the range 170 to 190 g/L. (In this system, titratable ammonia is to be understood as dissolved ammonia which can be titrated with sulphuric acid to an end point at pH 4.) U.S. Pat. No. 2,728,636 indicated that a high temperature autoclave oxidation (above 100° C.) was required after the solution was saturated with ammonia, in order to precipitate cobaltic hexammine sulphate. It will be understood that for the precipitation to be effective the bulk of the cobalt and nickel in the solution must be present as the cobaltic and nickel hexammine ions respectively.

It has also been found that a high concentration of ammonium sulphate, i.e. above about 150 g/L is necessary for the most effective precipitation of the triple salt. However, excessively high titratable ammonia or ammonium sulphate levels in the leach liquor can lead to premature precipitation of the triple salt when the autoclave discharge slurry is cooled before the liquid solid separation step to remove the leach residue. In such a situation, significant losses of cobalt to the leach residue may result. Generally, therefore the titratable ammonia level in the leach liquor should not exceed about 150 g/L $NH_3$, and the ammonium sulphate level should not exceed about 250 g/L, $(NH_4)_2SO_4$.

When the cobaltic hexammine sulphate and ammonium sulphate concentrations are in the specified range, the triple salt can be precipitated by increasing the titratable ammonia content of the solution to the range 170 to 190 g/L, $NH_3$, and cooling the solution to 50° C. or lower temperature. Ammonia may be added either by sparging anhydrous ammonia into the solution, or by adding a concentrated solution of ammonium hydroxide. The precipitation of cobalt from the solution does not go to completion, since cobaltic hexammine sulphate remains slightly soluble in the leach liquor even at the high ammonia concentration, and usually some of the cobaltic ion is present in the form of pentammine complex species, which do not precipitate with the triple salt. Lower temperatures than about 20° C. do not significantly increase the efficiency of cobalt precipitation, the preferred temperature range being 20° to 40° C. Precipitation of the triple salt occurs rapidly after the addition of ammonia. The resulting nickel hexammine solution will typically contain about 2 g/L of residual cobalt. Neither increased retention time beyond about 15 minutes, nor additional staging, results in a significant increase in cobalt precipitation.

If an excessive amount of ammonia is added to the leach liquor, or if the ammonium sulphate concentration is too high i.e. greater than about 300 g/L, nickel hexammine sulphate coprecipitates with the triple salt, resulting in a precipitate with a lower Co:Ni ratio. As a result the optimum precipitation of cobalt occurs at about 170 to 190 g/L titratable $NH_3$ when the nickel content of the solution is less than about 75 g/L Ni. While more efficient cobalt removal can be achieved from more dilute nickel solutions, it will be appreciated that dilution of the nickel concentration, below about 50 g/L Ni, is economically undesirable, since it will result in an excessively dilute solution to be processed in the nickel reduction circuit, thus reducing the productivity, of the refinery.

The preferred solution composition and process conditions for the triple salt precipitation step are thus defined as follows:

| Feed Solution Composition | |
|---|---|
| Nickel Concentration | 50 to 75 g/L |
| Cobalt Concentration | 5 to 15 g/L |
| Ammonia:Metals Mole Ratio | 5:1 to 6.5:1 |
| Ammonium Sulphate Concentration | 150 to 250 g/L |
| **Process Conditions** | |
| Temperature | 20 to 40° C. |
| Terminal Titratable Ammonia | 170 to 190 g/L |
| Retention Time | 15 min. |

After filtration to remove the nickel hexammine sulphate solution, the triple salt is repulped with a controlled amount of water, and is leached at about 20° C. to selectively dissolve nickel hexammine sulphate, as well as other trace metals such as copper, zinc and cadmium, to produce a crystalline cobaltic hexammine sulphate with a Co:Ni ratio of 100:1 or higher. The leach liquor which typically contains 50 to 65 g/L Ni and 10 to 15 g/L Co, with 100 to 120 g/L titratable ammonia, is recycled to the triple salt precipitation step.

A significant aspect of the invention is the discovery that the triple salt can be leached in water at ambient temperature to extract over 99% of its nickel hexammine sulphate content with only about 20% of its cobaltic hexammine sulphate content, to yield a crystalline cobaltic hexammine sulphate with a Co:Ni ratio of over 100:1. The leach liquor is very suitable for recycle to the triple salt precipitation step, where most of the cobalt is reprecipitated as the triple salt, and most of the nickel and ammonium sulphate remain in the nickel solution. Consequently a process consisting of the triple salt precipitation step, followed by water leaching of the triple salt, with recycle of the leach liquor to the precipitation step, provides a most effective and economical method of separating cobalt from the ammoniacal nickel-cobalt leach liquors. The relatively pure cobalt salt produced by this process, can be further upgraded by recrystallization to a cobaltic hexammine sulphate with a Ni:Co ratio of over 1000:1, which is particularly suitable as a feed to prior an processes for producing high grade cobalt powder and cobalt salts.

The key to successful operation of the water leach is to control the amount of water added. If too much water is added, all the cobalt hexammine sulphate is leached along with the nickel hexammine sulphate. If too little water is added, the extraction of nickel hexammine sulphate is incomplete, and too much nickel remains in the cobaltic hexammine salt. It has been found that the most effective leaching is achieved if the amount of water added is controlled so that the leach liquor contains 100 to 120 g/L of titratable ammonia.

The principal source of titratable ammonia in the solution produced by leaching the triple salt in water, is the nickel hexammine sulphate itself. (Ammonia complexed with cobalt in the cobaltic hexammine ion is more tightly bound, and cannot be titrated with sulphuric acid at pH 4.) Each nickel hexammine ion, $[Ni(NH_3)_6]^{2+}$, contains six ammonia molecules which go into solution with the nickel. Thus if 65 g/L of nickel dissolves, 112 g/L of titratable ammonia will go into solution. Other titratable ammonia may also come from other divalent metal ammine ions, e.g. those of Cu and Zn, which also leach with the nickel, and from entrained liquor in the triple salt, which contains 170 to 190 g/L $NH_3$. It has been found that titratable ammonia concentrations, above about 120 g/L $NH_3$ inhibit the leaching of nickel hexammine sulphate at 20° to 40° C. In practice the water addition rate is adjusted to produce a leach solution containing 100 to 120 g/L titratable ammonia when ≧99% of the nickel has been extracted.

The water leaching of the triple salt should be carried out at as low a temperature as practical, and preferably in the temperature range 20° to 40° C., to minimize both the dissolution of cobaltic hexammine sulphate, and the loss of ammonia from the solution by evaporation. In a continuous leaching system a retention time of 15 to 30 minutes and at least two leaching stages are sufficient to extract over 99% of the nickel content of the triple salt.

Since the leach liquor contains a high concentration of nickel, it is essential for efficient removal of nickel from the cobaltic hexammine salt, that the solids should be well washed with a nickel-free solution to displace the entrained solution, during the liquid-solid separation step. Since the cobaltic salt is appreciably soluble in cold water and aqueous ammonium sulphate solution, the preferred wash medium is an aqueous ammonium hydroxide solution with an ammonia content of 130 to 150 g/L $NH_3$, in which the cobaltic salt is only slightly soluble.

The final stage in the separation of cobalt from nickel is the recrystallization of the cobaltic hexammine sulphate produced in the water leaching step. The solubility properties of cobaltic hexammine sulphate in water and in aqueous solutions of ammonia and ammonium sulphate have been described in detail by I. Y. Lesch, et al, in Zh. Prikl. Khim., 43 (1970) page 1665. The process of dissolving the cobaltic salt in hot water or aqueous ammonium sulphate solution, and reprecipitating the cobaltic hexammine sulphate by cooling the solution and adding ammonia, to minimize the solubility of the cobaltic hexammine ion, upgrades the cobaltic salt from a Co:Ni ratio of over 100:1 to a Co:Ni ratio of over 1000:1. Nickel remains in the recrystallization mother liquor which is recycled to the nickel circuit.

In both the triple salt precipitation step and in the water leach, copper, zinc and cadmium follow nickel, rather than cobalt. As a result the recrystallized cobaltic hexammine sulphate salt contains very low levels of copper and cadmium. In the prior an processes, such as the soluble cobaltic pentammine process, these metals follow cobalt in the cobalt-nickel separation step, and must be removed from the solution in an additional sulphide precipitation circuit. The purified cobaltic hexammine salt can be used as the feed to processes for the production of cobalt metal or cobalt chemicals, using known prior art procedures. For the production of cobalt powder by hydrogen reduction, for example, the purified salt is redissolved in hot ammonium sulphate solution, and is then treated with cobalt powder to reduce Co (III) to Co (II), and with sulphuric acid to adjust the ammonia:cobalt mole ratio to about 2:1. This solution then forms the feed to the cobalt reduction step, where cobalt powder is produced using hydrogen at elevated temperature and pressure. Alternatively the purified cobaltic hexammine sulphate can be pyrolyzed to cobalt (II) sulphate, or cobalt oxides.

The process of this invention represents a major simplification in the process of separating and refining of cobalt, from nickel-cobalt sulphides, with a corresponding benefit in process economics. Since the by-product nickel-cobalt sulphides, recovered from the nickel reduction end solution, can be recycled to the ammonia pressure leach, a large part of the prior art cobalt refining process can be eliminated. Thus the acid pressure leach, the solution purification steps, and the soluble cobaltic pentammine process steps can be eliminated, and replaced by the water leach, recrystallization and redissolution steps.

The process of the invention has a number of further economic and technical advantages over the prior art technology. The only chemical reagents used are ammonia and ammonium sulphate, neither of which is consumed in the process, and both can be recovered for reuse in very high yield. Since there is a substantial reduction in the use of sulphuric acid in the leaching and cobalt separation steps compared with the prior art process, the production of by-product ammonium sulphate is reduced. The separation steps are carried out at low temperatures with consequent reduction in energy consumption. The recovery of cobalt as a purified salt, of constant composition, instead of as a purified aqueous solution of variable concentration, provides a greater degree of control in adjusting the composition of solution feeds to the subsequent metal recovery steps, thus permitting increased utilization of existing equipment. Finally, all the precipitated solids are easy to separate from the solutions, either by sedimentation, filtration or centrifuging.

In its broad aspect, the process of the present invention relates to the separation of cobalt in the form of cobalt (III) hexammine sulphate from an aqueous solution containing cobalt (III) hexammine sulphate and nickel (II) hexammine sulphate with a Ni:Co ratio greater than 1:1, comprising adding ammonium sulphate to provide an effective mount of ammonium sulphate, saturating the solution with an effective amount of ammonia at a temperature whereby the triple salt of cobalt (III) hexammine sulphate, nickel (II) hexammine sulphate and ammonium sulphate is precipitated, usually at a temperature below 50° C. and preferably at a temperature in the range of 20 to 40° C., recovering the precipitated triple salt from the solution, and repulping the triple salt with an effective amount of water or aqueous ammonia solution to selectively leach nickel (II) hexammine sulphate to produce a crystalline cobalt (III) hexammine sulphate, preferably with a Co:Ni weight ratio of at least 100:1, and a nickel enriched solution.

More particularly, the process of the invention relates to the production of a cobalt (III) hexammine sulphate which comprises leaching nickel-cobalt sulphides in an ammoniacal ammonium sulphate solution under an elevated pressure of an oxygen-bearing gas such as air or oxygen, at a temperature of preferably at least 80° C. with an effective ammonia to metals mole ratio preferably in the range of 5:1 to 6.5:1 to oxidize nickel and cobalt sulphides to sulphates, and to produce an ammoniacal leach liquor in which dissolved cobalt is predominantly in the (III) oxidation state, and a leach residue. The leach liquor, which may be separated from the leach residue, is treated by saturating it with an effective amount of ammonia and the ammoniated leach liquor is cooled to below 50° C. whereby the triple salt of cobalt (III) hexammine sulphate, nickel (II) hexammine sulphate and ammonium sulphate is precipitated, the precipitated triple salt recovered from the leach liquor, and the triple salt repulped with an effective amount of water or an aqueous ammonium hydroxide solution to selectively leach nickel (II) hexammine sulphate and to produce a crystalline cobaltic (III) hexammine sulphate with a Co:Ni ratio of preferably at least about 100:1 and a nickel enriched leach liquor.

In a second preferred aspect of the invention, the process additionally comprises recovering the cobaltic (III) hexammine sulphate, dissolving the recovered cobaltic (III) hexammine sulphate in hot ammonium sulphate solution, and cooling and ammoniating the solution to precipitate recrystallized cobaltic (III) hexammine sulphate having a Co:Ni ratio of at least about 1000:1.

In another preferred aspect, the process of the invention additionally comprises recovering the recrystallized cobaltic (III) hexammine sulphate from the solution, redissolving the recrystallized cobaltic (III) hexammine sulphate in hot ammonium sulphate solution, treating the said hot ammonium sulphate solution containing redissolved cobaltic (III) hexammine sulphate with an effective mount of cobalt powder to reduce Co(III) to Co (II) and with an effective mount of sulphuric acid to adjust the ammonia:cobalt mole ratio to about 2:1 to produce cobalt (II) diatomic sulphate in solution, and treating the cobalt (II) diamine sulphate solution with hydrogen to produce cobalt powder therefrom.

DESCRIPTION OF THE PREFERRED EMBODIMENTS OF THE INVENTION

Figure 1:
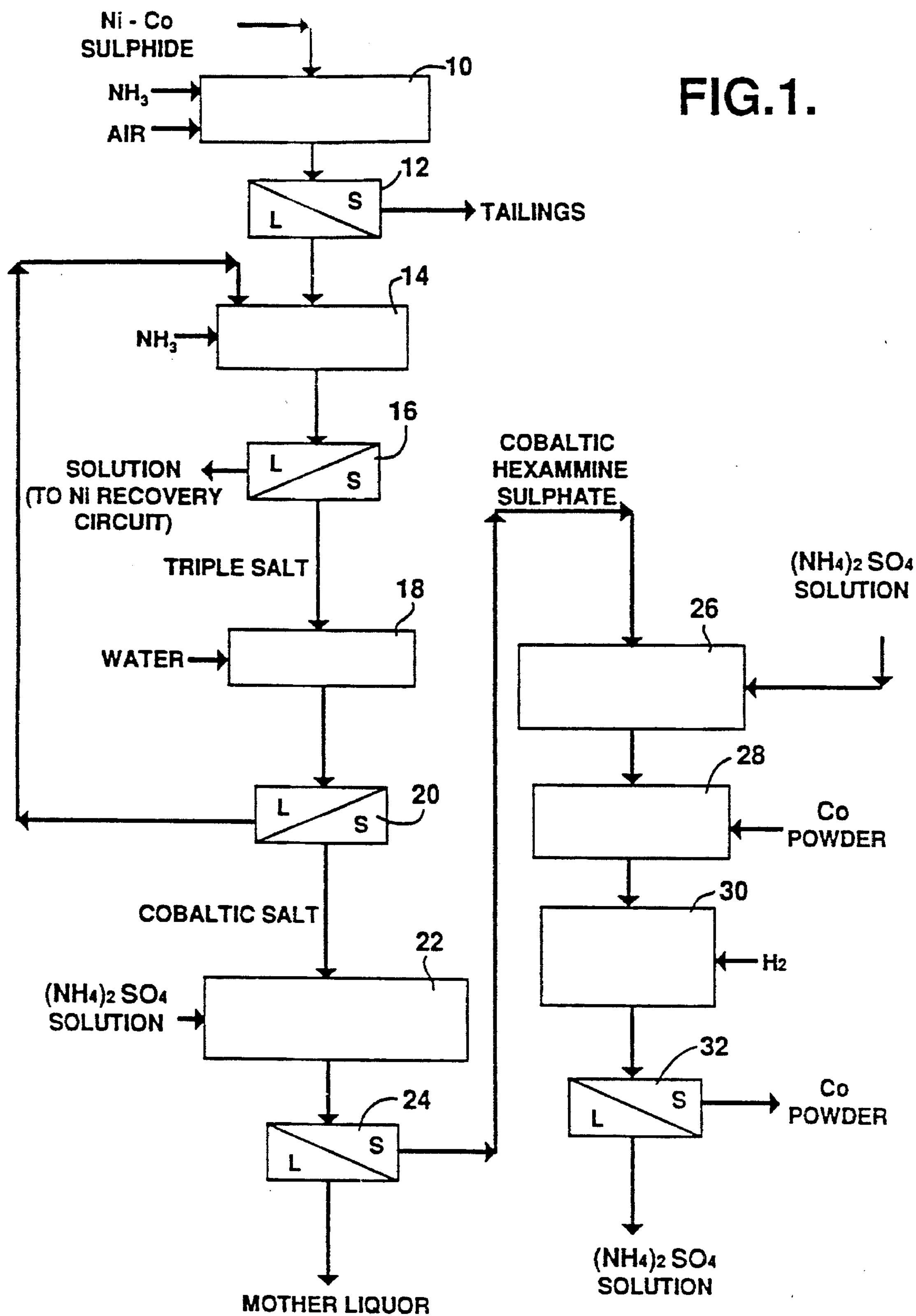
FIG. 1 is a schematic flowsheet of a preferred embodiment of the process.

Mixed nickel-cobalt sulphides in a finely divided state are first pressure leached in a conventional ammoniacal ammonium sulphate pressure leach 10, under elevated air pressure of at least 500 kPa, at a temperature of at least 80° C., to oxidize the nickel and cobalt sulphides to the corresponding sulphates. The ammonium sulphate concentration is maintained in the range 150 to 250 g/L and the titratable ammonia concentration is adjusted to maintain the titratable ammonia to divalent metal mole ratio in the range 5:1 to 6.5:1, preferably at about 6:1, to maximize the formation of the hexammine complex ions of nickel (II) and cobalt (III). The leach solution produced will typically contain from 20 to 80 g/L nickel and from 4 to 20 g/L cobalt.

After a liquid-solid separation 12, to remove the leach residue containing insoluble iron oxide and gangue from the ammoniacal pressure leach 10, the leach liquor is saturated with ammonia to increase the titratable ammonia concentration to the range 170 to 190 g/L, and cooled to below 50° C., preferably to the range 20° to 40° C., in triple salt precipitation 14.

Under these conditions a crystalline triple salt, containing cobalt (III) hexammine sulphate, nickel (II) hexammine sulphate, and ammonium sulphate, with a Co:Ni ratio of about 1:1, is precipitated, typically leaving about 2 g/L Co with 15 to 70 g/L Ni in solution. This solution is suitable for treatment by prior art processes, to produce nickel powder meeting market specifications for cobalt content. The residual cobalt in the nickel solution passes through the nickel powder reduction step, and is precipitated with hydrogen sulphide as a nickel-cobalt sulphide with a Ni:Co ratio of about 1:1 in a sulphide precipitation step, not shown. This sulphide is recycled as feed to the ammonia pressure leach 10.

The triple salt, which is recovered by filtration 16 from the cooled liquor, is repulped with a controlled mount of water, and is leached at about 20° C. in water leach 18 to selectively leach nickel hexammine sulphate, as well as other trace metals such as copper, zinc and cadmium, to produce a crystalline cobaltic hexammine sulphate, with a Co:Ni ratio of 100:1 or higher. The leach liquor which typically contains 50 to 65 g/L Ni and 10 to 15 g/L Co with 100 to 120 g/L titratable $NH_3$, is recycled to the triple salt precipitation step 14, where most of the cobalt is reprecipitated, and the soluble nickel is returned to the nickel circuit.

The cobaltic hexammine sulphate is recovered by liquid-solid separation 20 and is further upgraded by recrystallization in step 22 wherein the salt is dissolved in hot ammonium sulphate solution and is reprecipitated by cooling and ammoniation to yield a cobaltic hexammine sulphate product with a Co:Ni ratio of 1000:1 or higher. The mother liquor is recycled to ammonia pressure leach 10 and the purified cobalt salt forms the feed for the production of cobalt metal or cobalt chemicals, using known prior an processes. For the production of cobalt powder by hydrogen reduction, for example, the purified salt is recovered by liquid-solid separation 24 and redissolved in hot ammonium sulphate solution in redissolution step 26, and is then treated with cobalt powder to reduce Co (III) to Co (II), and with sulphuric acid to adjust the ammonia:cobalt mole ratio to about 2:1, in conversion step 28. This solution then forms the feed to the cobalt reduction step 30, in which cobalt powder is produced using hydrogen at elevated temperature and pressure, and is separated from the ammonium sulphate solution by liquid-solid separation 32. Alternatively the purified cobaltic hexammine sulphate can be pyrolyzed to cobalt (II) sulphate, or cobalt oxides.

The process of the invention is further illustrated with reference to the following non limitive examples.

EXAMPLE 1

This example illustrates the process of the invention for triple salt precipitation from ammoniacal ammonium sulphate leach liquor containing nickel and cobalt. All percentages are by weight unless otherwise indicated for this and subsequent examples. A sample of a nickel-cobalt sulphide, containing 53.2% Ni, 5.1% Co, 0.58% Fe and 35.7% S, was batch pressure leached in a solution containing 220 g/L ammonium sulphate and 160 g/L ammonia for 2 h at 85° C. with a 200 kPa oxygen overpressure. The discharge slurry was filtered without cooling to separate the leach liquor from the leach residue. Metal extractions were 98% Ni and 97% Co. The leach solution contained 73 g/L Ni, 7.0 g/L Co and 140 g/L titratable ammonia. The Ni:Co weight ratio was 10.4:1, and the $NH_3$:Ni mole ratio was 6.6:1.

2.0 L of the filtered leach liquor from the pressure leach was cooled to 40° C. and sparged with anhydrous ammonia vapor to increase the titratable ammonia level to about 180 g/L $NH_3$. The resulting slurry was cooled to 25° C. and filtered. The liquor contained 63 g/L Ni, 1.5 g/L Co and 177 g/L $NH_3$, while the crystalline precipitate (133 g) contained 9.75% Ni, 8.0% Co and 14.7% S. The precipitate had a Ni:Co ratio of 1.2:1, while the solution had a Ni:Co ratio of 42:1. The precipitate contained 76% of the cobalt content of the leach liquor and only 9% of the nickel content.

EXAMPLE 2

This example indicates the effect of temperature on triple salt solubility. Three samples of an ammoniacal ammonium sulphate solution, produced by the pressure leaching of the same nickel-cobalt sulphide as was used in Example 1, containing 69 g/L Ni, 6.4 g/L Co, 118 g/L NH, and 220 g/L ammonium sulphate, were placed in agitated tanks and sparged with anhydrous ammonia to increase the titratable ammonia concentration to 180 g/L $NH_3$ at 25° C., and filtered at temperatures of 2.5, 40 and 85° C. respectively. The compositions of the resulting precipitates and solutions are summarized in Table 1.

TABLE 1

| Filtration Temperature, °C. | 25 | 40 | 85 |
|---|---|---|---|
| Weight of Precipitate, g/L | 47.5 | 45.3 | 40.1 |
| Solution, g/L Ni | 53 | 54 | 60 |
| Solution, g/L Co | 1.6 | 1.6 | 1.6 |
| Solution, 9/L $NH_3$ | 162 | 169 | 152 |
| Precipitate, % Ni | 10.4 | 10.1 | 10.1 |
| Precipitate, % Co | 7.8 | 7.7 | 7.8 |
| Ratio Ni:Co | 1.3 | 1.3 | 1.3 |
| Cobalt Precipitation, % | 70 | 70 | 57 |

EXAMPLE 3

This example illustrates triple salt precipitation from a solution with a 5:1 nickel:cobalt ratio. A 420 liter batch of a solution containing 60 g/L Ni, 10.8 g/L Co, and 4.2 g/L Cu, from a commercial ammonia pressure leach circuit treating nickel-cobalt sulphides, was sparged with anhydrous ammonia in a single stage continuous circuit with a retention time of 30 minutes at 40° C., to raise the titratable ammonia level to 170 g/L $NH_3$. The resulting slurry was filtered to yield 475 liters of solution containing 46 g/L Ni, 3.9 g/L Co and 3.7 g/L Cu, and 47 kg of crystalline triple salt filter cake with a moisture content of about 25%. The filter cake analyzed 6.8% Ni and 5.7% Co. Cobalt recovery to the triple salt was approximately 60%, together with 13% of the nickel and 3% of the copper contents of the leach solution.

EXAMPLE 4

The water leaching of triple salt is described in this example. A 145 g sample of triple salt containing 7.5% Ni, and 6.2% Co was leached in 200 mL water at 40° C. for 30 minutes. The slurry was filtered to separate the solids from the leach solution, and the filter cake was washed with 100 mL of 150 girl aqueous ammonia solution. The leach residue (30 g) analyzed 18.4% Co, 0.11% Ni with a Co:Ni ratio of 170:1, and the combined leach and wash solutions analyzed 35 g/L Ni and 11.2 g/L Co with a Ni:Co ratio of 3.1:1. Approximately 60% of the cobalt content of the triple salt was recovered in the cobaltic hexammine sulphate leach residue.

EXAMPLE 5

The water leaching of triple salt at increased pulp density is illustrated in this example. Three 10 kg batches of triple salt filter cake, produced in Example 3, were each leached in 7.5 liters of water at 30° C. for 30 minutes with vigorous agitation. The leach slurries were filtered on a batch vacuum filter and each filter cake was displacement washed with 2.5 L of 150 g/L aqueous ammonia solution. The leach residue and solution analyses are summarized in Table 2.

TABLE 2

| | Leach Residue | | | Leach Solution | | |
|---|---|---|---|---|---|---|
| Batch | % Ni | % Co | Ratio Ni:Co | g/L Ni | g/L Co | Ratio Ni:Co |
| 1 | 17.4 | 0.140 | 124 | 64.3 | 15.0 | 4.3 |
| 2 | 17.7 | 0.126 | 141 | 65.8 | 15.7 | 4.2 |

TABLE 2-continued

| | Leach Residue | | | Leach Solution | | |
|---|---|---|---|---|---|---|
| Batch | % Ni | % Co | Ratio Ni:Co | g/L Ni | g/L Co | Ratio Ni:Co |
| 3 | 17.3 | 0.188 | 92 | 68.9 | 14.3 | 4.1 |

Over 70% of the cobalt content of the triple salt was recovered in the cobaltic hexammine sulphate leach residues.

EXAMPLE 6

The effect of pulp density on the water leaching of triple salt is shown in this example. Table 3 summarizes data obtained in a series of leach tests in which 200 g of wet triple salt filter cake (164 g dry) was leached in increasing volumes of water from 100 mL up to 400 mL at 25° C. for 30 minutes. In each case the leach residue was displacement washed with 150 g/L aqueous ammonia solution to remove entrained nickel containing leach liquor.

TABLE 3

| | | | | | |
|---|---|---|---|---|---|
| Volume of Water, mL | 100 | 150 | 200 | 300 | 400 |
| Volume of Leachate, mL | 170 | 240 | 290 | 380 | 470 |
| Leachate, g/L $NH_3$ | 130 | 95 | 87 | 67 | 52 |
| Ni | 82 | 55 | 49 | 39 | 32 |
| Co | 18 | 19 | 15 | 13 | 11 |
| Ratio, Ni:Co | 4.5 | 2.9 | 3.2 | 3.0 | 2.9 |
| Residue, % Co | 15.0 | 17.1 | 17.3 | 17.3 | 17.3 |
| Ni | 0.05 | 0.07 | 0.13 | 0.08 | 0.10 |
| Ratio, Ni:Co | 300 | 240 | 130 | 220 | 170 |
| Co Recovery to Residue, % | 72 | 63 | 65 | 63 | 58 |

EXAMPLE 7

This example illustrates the recrystallization of cobaltic hexammine sulphate. A 5.8 kg blended batch of the cobaltic hexammine sulphate produced in Example 5, with a Co:Ni ratio of 116:1, was dissolved in 10 liters of an aqueous solution containing 200 g/L ammonium sulphate solution at 80° C. The solution was cooled to 40° C and anhydrous ammonia vapor was sparged into the solution to increase the titratable ammonia level to about 100 g/L $NH_3$. The orange cobaltic hexammine sulphate crystals were filtered off and displacement washed with 150 g/L aqueous ammonia solution. The recrystallized salt analyzed 18.2% Co, 0.0053% Ni, corresponding to a Co:Ni ratio of 3400:1. The salt also contained 750 g/t Zn, 20 g/t Fe and less than 10 g/t Cu and Cd.

EXAMPLE 8

The production of cobalt powder from cobaltic hexammine sulphate is described in this example. The recrystallized cobaltic hexammine salt, produced in example 7, was redissolved in ammonium sulphate solution, treated with cobalt powder to reduce the cobaltic salt to cobaltous; and treated with hydrogen at high temperature and pressure to produce cobalt powder, using prior an procedures. The powder product contained impurity levels of 700 g/t Ni, 300 g/t S, 30 g/t Fe, 40 g/t Cr, 8 g/t Cd, and less than 5 g/t Cu and Zn.

It will be understood that other embodiments and examples of the invention will be readily apparent to a person skilled in the art, the scope of the invention being defined in the appended claims.

I claim:

1. A process for separating cobalt in the form of cobalt (III) hexammine sulphate from an aqueous solution containing cobalt (III) hexammine and nickel (II) hexammine sulphate with a Ni:Co ratio greater than 1:1, comprising adding ammonium sulphate to provide an effective amount of ammonium sulphate, saturating the solution with an effective amount of ammonia at a temperature whereby the triple salt of cobalt (III) hexammine sulphate, nickel (II) hexammine sulphate and ammonium sulphate is precipitated, recovering the precipitated triple salt from the solution, and repulping the triple salt with an effective mount of water or aqueous ammonia solution to selectively leach nickel (II) hexammine sulphate to produce a crystalline cobalt (III) hexammine sulphate, with a Co:Ni weight ratio of at least 100:1, and a nickel enriched solution.

2. A process as claimed in claim 1 in which the aqueous solution is ammoniated at a temperature below about 50° C.

3. A process as claimed in claim 1 in which the aqueous solution is ammoniated at a temperature in the range of about 20° to 40° C.

4. A process for producing cobalt (III) hexammine sulphate, comprising leaching nickel-cobalt sulphides in an ammoniacal ammonium sulphate solution under an elevated pressure of an oxygen-bearing gas and at an elevated temperature with an effective ammonia to metals mole ratio to oxidize nickel and cobalt sulphides to sulphates, and to produce an ammoniacal leach liquor in which dissolved cobalt is predominantly in the (III) oxidation state, and a leach residue, ammoniating the leach liquor by saturating it with an effective amount of ammonia and cooling the ammoniated leach liquor whereby the triple salt of cobalt (III) hexammine sulphate, nickel (II) hexammine sulphate and ammonium sulphate is precipitated, recovering the precipitated triple salt from the leach liquor, and repulping the triple salt with an effective amount of water or an aqueous ammonium hydroxide solution to selectively leach nickel (II) hexammine sulphate and to produce a crystalline cobaltic (III) hexammine sulphate and a nickel enriched leach liquor.

5. A process as claimed in claim 4 in which the nickel-cobalt sulphides are leached under an elevated air pressure at an elevated temperature of at least 80° C. with an effective ammonia to metal mole ratio in the range of 5:1 to 6.5:1.

6. A process as claimed in claim 5 in which the ammoniated leach liquor is cooled to a temperature below 50° C. whereby the triple salt of cobalt (III) hexammine sulphate, nickel (II) hexammine sulphate and ammonium sulphate is precipitated.

7. A process as claimed in claim 5 in which the ammoniated leach liquor is cooled to a temperature in the range of 20° to 40° C. whereby the triple salt of cobalt (III) hexammine sulphate, nickel (II) hexammine sulphate and ammonium sulphate is precipitated, and repulping the triple salt with an effective amount of water to selectively leach nickel (II) hexammine sulphate to produce a crystalline cobalt (III) hexammine sulphate, with a Co:Ni weight ratio of at least 100:1.

8. A process as claimed in claim 7 which additionally comprises recovering the cobaltic (III) hexammine sulphate, dissolving the recovered cobaltic (III) hexammine sulphate in hot ammonium sulphate solution, and cooling and ammoniating the solution to precipitate recrystallized cobaltic (III)

hexammine sulphate having a Co:Ni ratio of at least about 1000:1.

9. A process as claimed in claim 8 which additionally comprises recovering the recrystallized cobaltic (III) hexammine sulphate from the solution, redissolving the recrystallized cobaltic (III) hexammine sulphate in hot ammonium sulphate solution, treating the said hot ammonium sulphate solution containing redissolved cobaltic (III) hexammine sulphate with an effective amount of cobalt powder to reduce Co (III) to Co (II) and with an effective amount of sulphuric acid to adjust the ammonia:cobalt mole ratio to about 2:1 to produce cobalt (II) diamine sulphate in solution, and treating the cobalt (II) diatomic sulphate solution with hydrogen to produce cobalt powder therefrom.

10. A process for producing cobalt powder from nickel-cobalt sulphides comprising leaching said nickel-cobalt sulphides in an ammoniacal ammonium sulphate solution under an elevated pressure of an oxygen-beating gas, at a temperature of at least 80° C. with an effective ammonia to metals mole ratio in the range of 5:1 to 6.5:1 to oxidize the nickel and cobalt sulphides to sulphates, and to produce an ammoniacal leach liquor in which dissolved cobalt is predominantly in the (III) oxidation state, and a leach residue, separating the leach liquor from the leach residue, saturating the leach liquor with an effective amount of anhydrous ammonia and cooling the ammoniated leach liquor to below 50° C. whereby the triple salt of cobalt (III) hexammine sulphate, nickel (II) hexammine sulphate and ammonium sulphate is precipitated, recovering the precipitated triple salt from the leach liquor, repulping the triple salt with an effective mount of water to selectively leach nickel (II) hexammine sulphate and to produce a crystalline cobaltic (III) hexammine sulphate with a Co:Ni ratio of at least 100:1 and a nickel enriched leach liquor, recovering the cobaltic (III) hexammine sulphate, dissolving the recovered cobaltic (III) hexammine sulphate in hot ammonium sulphate solution, and cooling and ammoniating the solution to precipitate recrystallized cobaltic (III) hexammine sulphate having a Co:Ni ratio of at least about 1000:1, and treating the recrystallized cobaltic (III) hexammine sulphate to produce cobalt powder therefrom.

11. A process as claimed in claim 10 which comprises treat the recrystallized cobaltic (III) hexammine sulphate by recovering the recrystallized cobaltic (III) hexammine sulphate from the solution, redissolving the recrystallized cobaltic (III) hexammine sulphate in hot ammonium sulphate solution, treating the said hot ammonium sulphate solution containing redissolved cobaltic (III) hexammine sulphate with an effective amount of cobalt powder to reduce Co(III) to Co (II) and with an effective amount of sulphuric acid to adjust the ammonia:cobalt mole ratio to about 2:1 and treating the said hot ammonium sulphate solution with hydrogen to produce cobalt powder therefrom.

12. A process as claimed in claim 1, 2, 3, 4, 5, 6, 7, 8, 9, 10, or 11 in which the aqueous solution or the ammoniacal leach liquor is saturated with an effective amount of ammonia by adding anhydrous ammonia or a solution of ammonium hydroxide to provide about 170 to 190 g/L terminal titratable ammonia.

13. A process as claimed in claim 1, 2, 3, 4, 5, 6, 7, 8, 9, 10, or 11 in which the aqueous solution or the ammoniacal leach liquor is saturated with an effective amount of ammonia by adding anhydrous ammonia or a solution of ammonium hydroxide to provide about 170 to 190 g/L terminal titratable ammonia, and in which the aqueous solution or the ammoniacal leach liquor contain about 150 to 250 g/L ammonium sulphate.

14. A process as claimed in claim 4, 5, 6, 7, 8, 9, 10, or 11 in which the ammoniacal leach liquor is saturated with an effective amount of ammonia by adding anhydrous ammonia or a solution of ammonium hydroxide to provide about 170 to 190 g/L terminal titratable ammonia, in which the ammoniacal leach liquor contains about 150 to 250 g/L ammonium sulphate and in which the saturated leach liquor is cooled to a temperature in the range of 20° to 40° C.

15. A process as claimed in claim 1, 2, 3, 4, 5, 6, 7, 8, 9, 10 or 11 in which the precipitated triple salt is repulped with an effective amount of water at a rate to maintain the titratable ammonia concentration at about 100 to 120 g/L.

16. A process as claimed in claim 1, 2, 3, 4, 5, 6, 7, 8, 9, 10, or 11 in which the precipitated triple salt is repulped with an effective amount of water at a rate to maintain the titratable ammonia concentration at about 100 to 120 g/L, and in which the solution is maintained at a temperature in the range of about 20° to 40° C.

* * * * *